(No Model.)

A. F. NATHAN.
METHOD OF MARKING MEATS.

No. 605,120. Patented June 7, 1898.

ATTEST:
C. C. Burdine
D. E. Burdine.

A. F. Nathan,
INVENTOR;
By W. C. Dodge,
ATT'Y.

UNITED STATES PATENT OFFICE.

ALBERT F. NATHAN, OF KANSAS CITY, MISSOURI.

METHOD OF MARKING MEATS.

SPECIFICATION forming part of Letters Patent No. 605,120, dated June 7, 1898.

Application filed January 6, 1898. Serial No. 665,802. (No model.)

*To all whom it may concern:*

Be it known that I, ALBERT F. NATHAN, a citizen of the United States, residing at Kansas City, in the county of Jackson and State of Missouri, have invented certain new and useful Improvements in Methods of Marking Meats, of which the following is a specification.

My invention relates to a new method of marking meats; and the invention consists in placing the meat to be marked upon a skeleton frame or support containing the desired mark and then subjecting the meat so supported to the action of smoke.

Figure 2:
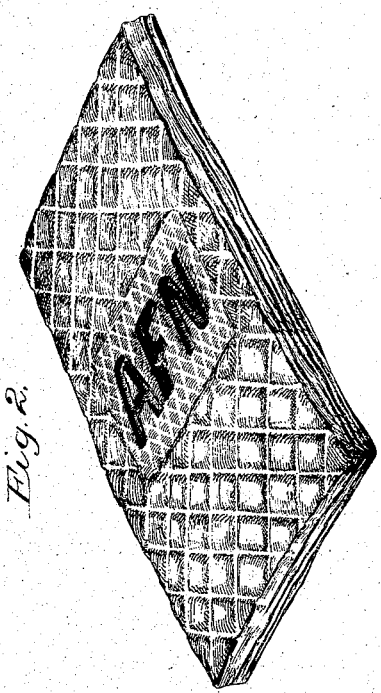
Figure 1:
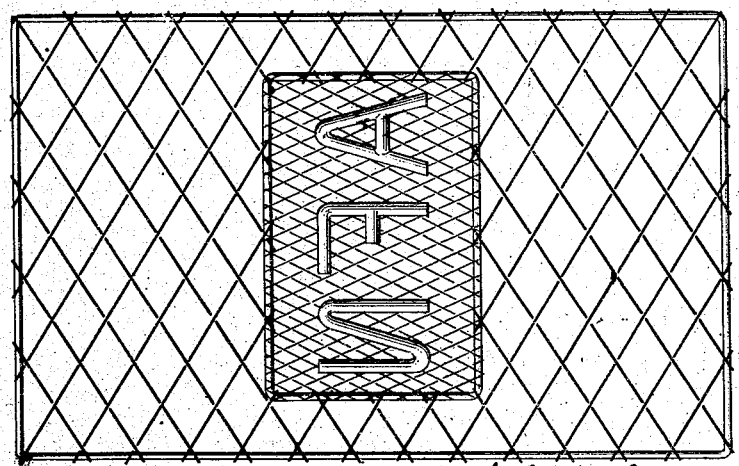

Figure 1 is a plan view of a skeleton frame adapted to support the meat and impress the mark; and Fig. 2 is a perspective view of a piece of smoked bacon, showing the mark thus formed thereon.

Owing to the enormous growth of the production of smoked meats—such as hams, shoulders, and bacon—and the increase in the number of establishments engaged in this business at home and abroad and the fact that much of these products are exported, it has become desirable to place on each piece of meat a mark to indicate by what party or concern it was prepared, and thereby prevent the consumer, the dealer, and the producer from being imposed upon by the sale of an inferior article as the genuine.

The usual method of marking smoked meats is to brand each piece by means of a branding-iron with the name of the party or company by whom the meat is prepared. This plan is objectionable for several reasons: first, because it necessitates a separate handling of each piece, which greatly increases the labor and time, and consequently the expense; second, because owing to the irregularity of the surface it is difficult to so brand it as to cause all the letters to show perfectly, thereby rendering the mark imperfect or defective, and especially so if the branding is done before the meat is smoked, as in that case the subsequent smoking tends to render the letters or mark still more obscure. Besides, to the extent that the meat is burned by the branding-iron it is injured or destroyed. To obviate these difficulties and at the same time produce a clear and lasting mark is the object of my present invention. This I accomplish as follows:

Instead of suspending the meat by strings while being smoked, as has been the usual custom, I first provide a series of skeleton frames or trays on which I fasten the letters or mark of any desired kind or form and lay the meat flatwise thereon, where it is retained during the operation of smoking the same. A skeleton frame or support for the purpose is shown in Fig. 1. It consists of a heavy wire for the outer frame with smaller wires crossed from side to side with a portion at the center, preferably, though not necessarily, composed of finer wires with smaller meshes. On this central portion I secure the letters or design of whatever kind desired or intended to be used as the distinctive mark, as indicated by the letters "A" "F" "N." (Shown in Fig. 1.) These letters are made of heavier wire or any suitable material and may be secured by solder or otherwise. When the fresh meat is placed on such a frame or support and allowed to remain until the smoking of it is completed, the result is that the meat which at first is in a comparatively soft condition settles down by its own weight upon the wires, which become partially embedded therein, so as to leave on the surface of the meat indentations corresponding to the wires and letters, as represented in Fig. 2, the letters, which are thicker and larger than the other wires, making indentations correspondingly deeper and larger, as there shown. In the operation of being smoked the meat is dried and hardened, so that these indentations are rendered permanent and will remain indefinitely. As the smoke cannot come into as intimate contact with the meat at those points where it rests upon the wires and letters as elsewhere, the result is that the surface at those points is left of a lighter color than elsewhere, and that aids to render the letters or marks more clear and distinct.

If a deeper impression is desired than will naturally be produced by the weight of the meat, pressure may be applied by means of weights or otherwise.

The only object in making the portion of the support to which the letters are attached of finer wire and with finer meshes is to afford better means for attaching or soldering the letters or design and at the same time form an ornamental base or groundwork for the same, thereby imparting to the letters or mark a more distinctive appearance and rendering the meat more attractive in appearance.

While I prefer to use raised letters or designs which project above the main surface of the frame or support, because they make deeper indentations and are therefore plainer and more durable, it is obvious that the formation of the letters or design may be reversed—that is to say, that instead of being indented they may be made in the form of raised letters or design. All that is required to accomplish this is to use a metal plate in which the letters or design are cut out, as in a stencil-plate, and secure it in the frame or support in lieu of the central section with its letters. It is obvious that when the meat is placed on a frame or support provided with such a plate the plate would become embedded in the meat, leaving the letters or design raised above that portion of the surface of the meat which rested on the plate. If this is to be used, the letters should be cut of good size with the openings of good width in order to permit the meat to more readily protrude through the same, thus making the letters or design stand out more distinctly. In such case it would also be advisable to leave as little area of surface in the plate, aside from that necessary to form and support the cut-out letters, as possible, as the less surface it has for the meat to rest upon the deeper and more readily will it be embedded in the surface of the meat, thereby adding to the distinctness of the raised letters or design. I prefer, however, to use the plan first above described, as I consider it is simpler if not better, and only describe this as an alternative plan that may be used if desired, the principle and mode of operation being the same in both, it being merely a matter of choice as to which shall be used.

It is obvious that instead of letters a monogram or any design that parties may adopt or choose may be used, or, if preferred, the name of the party; but as a general rule the initials alone or some arbitrary design or figure will be preferable, as they can be made larger and will not occupy as much space as would the name of a party or company, more especially on hams and shoulders, the surfaces of which are not as flat as that of bacon.

By this method I am enabled to produce on smoked meats any kind of mark, design, letters, or name desired in plain and durable characters and without any extra or separate handling of the meat for that purpose. It is of course understood that all smoked meats are pickled in brine for about thirty days before being smoked. In applying my method the meat may be placed upon the frames or trays when taken from the brine preparatory to placing it in the smoke-house; but I prefer to place the meat on the trays in the first instance and submerge the tray, with the meat on it, in the brine, as the meat when first dressed is in a softer condition than after it has been pickled and is therefore in a better condition to be indented by the letters or mark.

Having thus described my invention, what I claim is—

The herein-described method of producing a distinguishing-mark on meats, which consists in placing the meat while fresh on a support having on its face a projection or projections of the form of the mark to be produced, letting the meat lie thereon until the projections indent the mark in the meat, and then rendering the mark permanent by drying and hardening the meat by smoke or otherwise.

In witness whereof I hereunto set my hand in the presence of two witnesses.

ALBERT F. NATHAN.

Witnesses:
J. W. YOUNG,
W. A. WILLSON.